Figure 1:
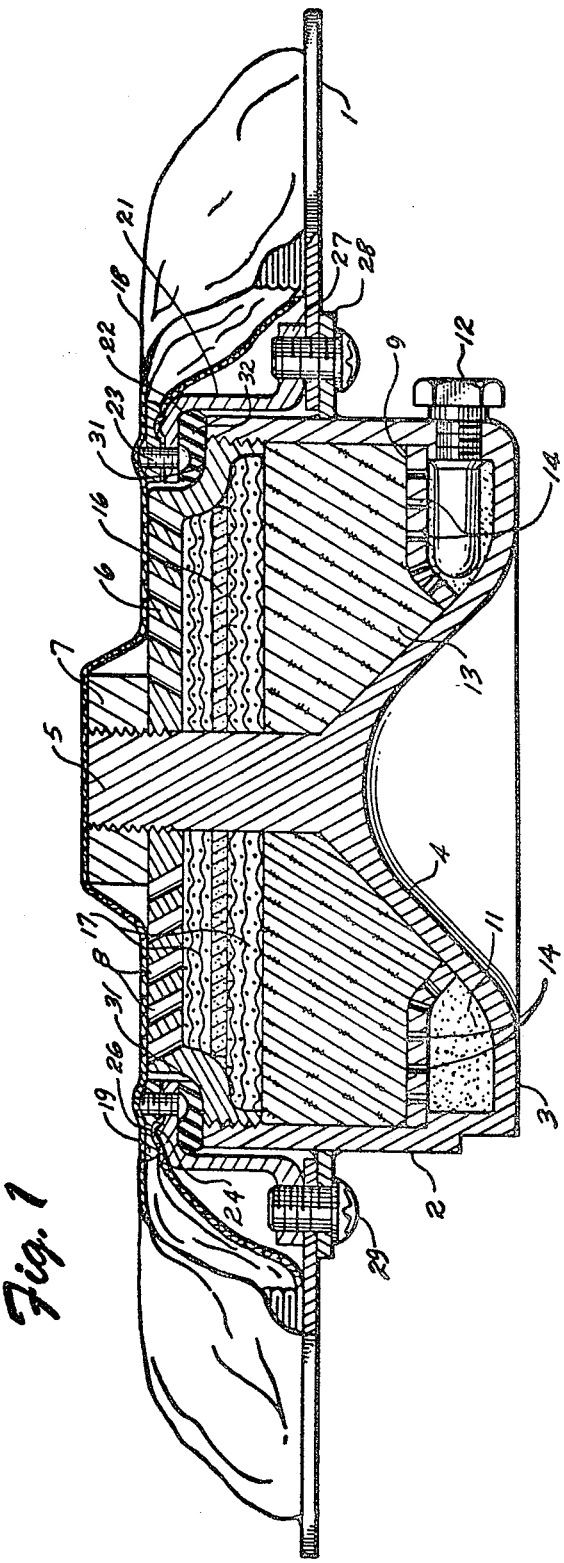

United States Patent [19]

Lynch

[11] 3,944,251

[45] Mar. 16, 1976

[54] GAS GENERATOR FOR AUTOMOBILE DRIVER RESTRAINT BAG

[75] Inventor: Robert W. Lynch, Fountain Valley, Calif.

[73] Assignee: Specialty Products Development Corporation, Oak Creek, Wis.

[22] Filed: June 28, 1974

[21] Appl. No.: 484,266

Related U.S. Application Data

[63] Continuation of Ser. No. 305,722, Nov. 13, 1972, abandoned, which is a continuation-in-part of Ser. No. 248,738, April 28, 1972, Pat. No. 3,827,715.

[52] U.S. Cl. ............... 280/150 AB; 23/281; 102/39; 280/87 C
[51] Int. Cl.² ............................................ B60R 21/08
[58] Field of Search ...... 280/150 AB, 87 R; 23/281; 102/39

[56] References Cited
UNITED STATES PATENTS

| | | |
|---|---|---|
| 3,450,414 | 6/1969 | Kobori ........................ 280/150 AB |
| 3,532,360 | 10/1970 | Leising ........................ 280/150 AB |
| 3,618,976 | 11/1971 | Leising ........................ 280/150 AB |
| 3,618,980 | 11/1971 | Leising ........................ 280/150 AB |
| 3,632,135 | 1/1972 | Chute ........................ 280/150 AB |
| 3,674,284 | 7/1972 | Lohr ........................ 280/150 AB |
| 3,761,111 | 9/1973 | Kemper ........................ 280/150 AB |
| 3,778,084 | 12/1973 | Sutherland ........................ 280/150 AB |
| 3,787,074 | 1/1974 | Lewis ........................ 280/150 AB |

*Primary Examiner*—M. H. Wood, Jr.
*Assistant Examiner*—John P. Silverstrim
*Attorney, Agent, or Firm*—Christie, Parker & Hale

[57] ABSTRACT

Separate subassemblies of a gas generator charged with a combustible propellant and an inflatable fabric bag for restraining an automobile driver are provided. The pre-folded bag is assembled to the gas generator in the final stages of assembly to minimize safety hazards in the bag folding operation. Means are provided for connecting the subassemblies and mounting them in a steering wheel.

4 Claims, 2 Drawing Figures

U.S. Patent March 16, 1976 3,944,251

GAS GENERATOR FOR AUTOMOBILE DRIVER RESTRAINT BAG

CROSS REFERENCE TO RELATED APPLICATIONS

This is a continuation of application Ser. No. 305,722, filed Nov. 13, 1972, now abandoned, which Ser. No. 305,722 is a continuation-in-part of Ser. No. 248,738, filed Apr. 28, 1972, now U.S. Pat. No. 3,827,715.

BACKGROUND OF THE INVENTION

Government regulations are requiring automobile manufacturers to provide passive restraint devices for automobile passengers in case of collision, and an inflatable bag between the passenger and the dashboard or the driver and the steering wheel appears suitable. Impact sensors are provided in the automobile and when a collision occurs, a gas system is activated for rapidly inflating the passenger restraint bag. Some such systems have employed stored pressurized gas which is suddenly released into the bag. Such systems have required very high pressures to obtain sufficient gas in a small enough volume. The stored volume of gas must be fairly high to compensate for the significant cooling that occurs upon rapid depressurization of the gas.

According to another technique, a propellant is burned to generate quantities of gas which are used to inflate the bag. Such gasses must enter the bag at a sufficiently low temperature that no injury occurs either to the passenger or to the bag. For similar reasons, hot particles must be prevented from entering the bag. The gasses that enter the bag are dissipated in the passenger compartment of the automobile and it is therefore necessary that they be nontoxic and substantially free of smoke.

To obtain high volumes of nontoxic gasses, a variety of deflagration propellants have been devised which react strong oxidizers with various organic materials. These combustions typically yield principally carbon dioxide and water vapor, often with an excess of oxygen for avoiding asphyxiation. In the progress of developing such propellants for practical systems, granular or powder mixtures of various oxidizers and organic materials have been provided.

A restraint system for the driver of a vehicle must be relatively small since the entire system is accommodated within the existing size envelope of the steering wheel. To fit in this envelope, the inflatable bag is folded to a compact volume with its mouth adjacent the gas generator. These bags are carefully folded in a pre-determined manner for orderly deployment and it has been found best to do this folding by hand. such manual bag folding may involve large numbers of people.

The pyrotechnic gas generators have some saftey hazard, particularly when accumulated in substantial numbers as would be required in a manufacturing operation. Folding the bags on loaded gas generators creates many logistics, facilities and safety problems.

It is desirable to provide an arrangement whereby the gas generators can be kept separate from other components of the system during manufacturing operations until as late in the assembly cycle as possible for optimum safety.

BRIEF SUMMARY OF THE INVENTION

There is, therefore, provided in practice of this invention according to a presently preferred embodiment an inflatable bag restraint system having a gas generator with an annular sealing surface around one face of the generator and an inflatable bag subassembly including a folded inflatable bag with a rigid rim at its mouth, said rim having an annular sealing surface for connection to the annular sealing surface of the gas generator with a resilient sealing gasket therebetween. An alternate approach provides a face seal between a flange integral with the gas generator and the mounting plate.

DRAWINGS

Figure 2:
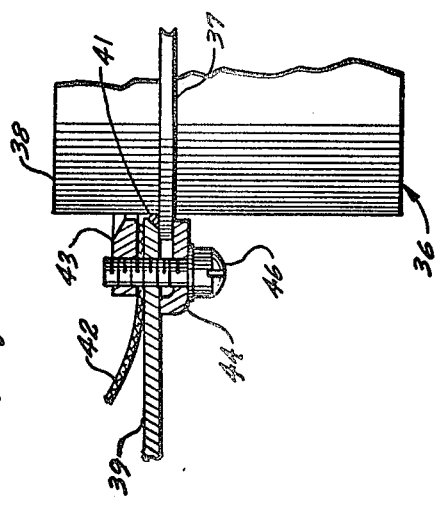

These and other features and advantages of the present invention will be appreciated as the same becomes better understood by reference to the following detailed description of a presently preferred embodiment when considered in connection with the accompanying drawings wherein FIG. 1 illustrates in transverse cross section a gas generator constructed according to principles of this invention, particularly for use in an automobile steering wheel; and FIG. 2 is a fragmentary view of an edge of a gas generator.

DESCRIPTION

The gas generator illustrated in FIG. 1 is particularly adapted to fit within the decorative hub structure of a conventional automobile steering wheel. A mounting plate 1 which may have a variety of configurations to adapt a gas generator to a variety of steering wheels is employed for supporting the driver restraint system. The mounting plate has a central circular aperture in which the gas generator is mounted. The gas generator has a cylindrical housing 2 having a flat back portion 3 that abuts a portion of the steering wheel hub (not shown). The housing has a central conical web 4 leading to an axial shaft 5. The conical web provides a depression on the back side of the generator to clear the end of the steering shaft.

A distributor plate 6 is threaded at its periphery and screws into the housing 2, the distributor plate is also supported at its center by a nut 7 threaded on to the axial shaft 5. A hermetic seal (not shown) may be provided on the inside or outside of the distributor plate to close the plurality of holes 8 through the distributor plate. The axes of the holes 8 extend generally radially outwardly at an angle of about forty-five degrees from the axis of the gas generator so that gases coming through the holes are not directed towards the face of the driver nor do they stream directly into the central portion of the bag. This reduces the initial deployment velocity of the bag to a safe limit.

A steel plate 9 is welded into the housing and divides the interior thereof into two chambers. The inner chamber is packed with an igniter propellant mix 11 which may, for example, be a rapidly burning mixture of a strong oxidizing agent and an oxygen bearing organic material as described in the above-referenced parent application. A conventional electrical initiator 12 is threaded through one side of the generator housing so as to be in contact with the propellant mixture 11. In a typical embodiment, about five grams of the igniter propellant mixture poured into the lower chamber through the initiator hole is sufficient.

ch of the interior of the gas generator housing is
:d with a granular gas generating propellant 13
ι may have a separator phase (not shown) dis-
d therein as described in greater detail in the
-referenced parent application. A plurality of
14 extend through the steel plate within the hous-
r optimum ignition. When the electrical initiator
:s, the igniter mixture 11 in the inner chamber of
using burns very rapidly and the hot gases so
ited pass through the holes 14 in the steel plate.
illy, the propellant mixture 13 in the main body
gas generator housing burns considerably slower
he igniter mixture. The numerous jets of hot gas
he igniter mixture ignite combustion in the main
lant 13 over a broad front so that the action
ds rapidly and completely. It will be noted that
of the holes 14 are angled to be approximately
l to the conical web 4 to further enhance ignition
main body of propellant 13.

ntered bronze disk 16 is spaced between the
lant mixture and the holes 8 through the distribu-
te. Typically, this disk is about ⅛ in. thick and
fficient porosity for passing the combustion gas
he propellant mixture without undue flow ob-
on. From four to six fine metal screens 17 are
cked into the housing in a position where the gas
herethrough enroute to the holes 8. The screens
onze disk extract heat from the gases, provide a
isation surface for reaction products and filter
e particles which could be damaging to a bag or
er.

nventional inflatable fabric bag 18 is positioned
e distributor plate 6 so that gas passing through
es 8 enters the interior of the bag. The bag is
n such a manner that much of its bulk is located
mounting plate beside the gas generator hous-
lesired, a portion of the folded bag may be ar-
over the distributor plate, particularly in the
rrounding the nut 7. Preferably, the bag is
n such a way as to have a minimum thickness
: nut 7 to stay within the available envelope of
ring wheel.

ag 18 has a metal attachment ring 19 within its
This ring may be a separate element or may be
ly bonded to the bag to aid in subsequent as-
A generally circular bag mounting rim 21 ex-
ound the outer end of the housing. This rim has
dly directed flange 22 which is connected to
attachment ring 19 by a plurality of bolts or
which preferably extend through an edge of
djacent its mouth for attachment and position-
g assembly. The flange has a raised annular rib
mates with a corresponding groove 26 in the
nting ring and collectively they serve to tightly
bag edge around its mouth to hold it in place
flation. Other means will be apparent for grip-
mouth of the bag, including, for example, a
ed integral with the bag and trapped between
hment ring and the flange.

n 21 has an outwardly extending flange 27
t least a portion of its circumference. Tabs
ised on the rim instead of the partial outer
is flange is connected to the mounting plate 1
lurality of tabs 28 welded on the gas genera-
g by a plurality of bolts 29. It will be apparent
sired, a mounting plate can be made integral
as generator in lieu of the tabs 28; however,
s making a variety of gas generators suitable
for mounting in different steering wheels. Similarly, if desired, the mounting plate can be made integral with the rim 21; however, this also means stocking a variety of parts to fit each steering wheel. It turns out from manufacturing convenience considerations to be preferable to have universally useful gas generators, universally useful folded bag subassemblies, and a plurality of specialized mounting plates.

The distributor plate 6 has an annular sealing surface 31 recessed below the front face of the gas generator and adjacent the open end of the housing 2. A relatively thick soft gasket 32 is positioned between the annular sealing surface formed by the underside of the flange 22 and by the recessed portion of the distributor plate and the housing end. This gasket seals the bag subassembly to the gas generator and prevents leakage during inflation. It serves the additional function of sealing the threads between the distributor plate and the housing for protecting the gas generating compositions before use.

By recessing the annular sealing surface on the distributor plate and housing, the rigid rim 21 and ring 19 are substantially below the front face of the gas generator. The assembled generator and folded bag are thus small enough to fit into a standard steering wheel hub. Further, the portion of the generator face around the central nut is also available for accommodating some of the pre-folded bag, if desired.

In the manufacturing operation, the gas generators are assembled with the propellants in place in a facility having the necessary safety features for handling such materials. The bags are connected to the rim 21 and attachment ring 19 at another facility and the bags are carefully folded for compact storage and proper deployment. These two subassemblies are suitable for use in any desired automobile steering wheel. Near the point of final manufacture, and with suitable safety precautions, the pre-folded bag subassembly and the gas generator subassembly are attached together with a gasket 32 therebetween. At this point, the mounting plate 1 suitable for a particular model of steering wheel is also attached and the completed assembly may be installed in an automobile steering wheel.

FIG. 2 is a fragmentary view illustrating an edge of a gas generator with a portion of the bag mounting assembly in cross section. As illustrated in this embodiment a cylindrical gas generator 36 has a peripheral flange 37 extending around it and set back from the front face 38 from which gases are ejected upon operation of the gas generator. The internal structure of the gas generator, propellants therein and the like may be as hereinabove described or of any other suitable arrangement.

A mounting plate 39 for adapting the gas generator to any of a variety of automobile steering wheels fits around the body of the gas generator 36 and has one face abutting the flange 37. An O-ring 41 may be captured between a chamfer on the mounting plate and the body and flange of the gas generator. This serves as a gas seal to minimize leakage from the interior of the gas bag 42, only a fragment of which is shown in FIG. 2. The O-ring is entirely optional and it has been found that the metal to metal interface between the mounting plate and flange is typically sufficiently tight that no substantial gas leakage occurs.

A retaining ring 43 fits into the circular mouth of the bag and is bolted to the mounting plate by a series of bolts (not shown). The mouth of the bag is, for example, a circular aperture having a series of smaller holes therearound for accommodating the bolts which connect the retaining ring and the mounting plate. Thus, the edge of the bag is captured between the retaining ring and the mounting plate for bag retention and sealing. Such a subassembly is made by bolting together the retaining ring and mounting plate with the bag therebetween. The bag is then folded to the desired configuration for mounting in a steering wheel.

At the last stages of assembly, a gas generator is inserted through the mounting plate into a position as shown in FIG. 2. Each of four L-shaped clips 44 is then connected to the retaining ring by four bolts 46. Part of the L-shaped clip bears against the side of the flange 37 opposite from the mounting plate and the other end of the L-shaped clip bears against the mounting plate. A simple final assembly step is therefore possible for connecting the prefolded bag subassembly to a preloaded gas generator subassembly for making a completed automobile occupant restraint system.

Many modifications and variations of the present invention will be apparent to one skilled in the art. Thus, for example, in the embodiment of FIG. 2 the flange around the gas generator may be made somewhat larger so as to be engaged by bolts and connected directly to the retraining ring thereby dispensing with the L-shaped clips. One could, for example, substitute push-in type fasteners or rivets for the bolts shown in the two embodiments. It is therefore to be understood that within the scope of the appended claims the invention may be practiced otherwise than as specifically described.

What is claimed is:

1. An inflatable bag automobile driver restraint system comprising:
    a generally cylindrical pyrotechnic gas generator including means for generating a sufficient volume of gas for inflating a driver restraint bag;
    a recessed annular sealing surface around the face of the gas generator through which gas is released;
    an inflatable bag subassembly including:
        a folded inflatable bag,
        a rigid ring in the mouth of the bag,
        a rigid rim around the gas generator and having an inwardly directed flange,
        means for connecting the inwardly directed flange and the ring with the mouth of the bag therebetween,
        an outwardly directed flange on the rim for connecting the rigid rim to the gas generator; a resilient sealing gasket between the annular surface on the gas generator and the inwardly directed flange, the gasket, inwardly directed flange and ring collectively being about the same thickness as the depth of the recess adjacent the sealing surface on the gas generator; and
        an adapter mounting plate connected to the gas generator and to the outwardly directed flange for attachment to a steering wheel.

2. An inflatable bag automobile driver restraint system comprising;
    a generally cylindrical gas generator including means for generating a sufficient volume of gas for inflating a driver restraint bag;
    a recessed annular sealing surface around the face of the gas generator through which gas is released;
    an inflatable bag subassembly including:
        a folded inflatable bag,
        a rigid ring in the mouth of the bag,
        a rigid rim around the gas generator and having an inwardly directed flange,
        means for connecting the flange and the ring with the mouth of the bag therebetween,
        means for connecting the rigid rim to the gas generator; and
    a resilient sealing gasket between the annular surface on the gas generator and the flange, the gasket, flange and ring collectively being about the same thickness as the depth of the recess adjacent the sealing surface on the gas generator; and wherein the means for connecting the rim to the gas generator comprises an outwardly directed flange on the rim; and further comprising:
    an adapter mounting plate connected to the gas generator and to the outwardly directed flange for attachment to a steering wheel; and wherein the gas generator comprises:
        a hollow housing having an open end;
        a distribution plate threaded into the housing, the distribution plate having a recessed periphery adjacent the open end of the housing, and wherein the recessed sealing surface is one the recessed periphery and the end of the housing so that the gasket seals the threads.

3. An inflatable bag restraint system comprising:
    a pyrotechnic gas generator subassembly including means for generating a sufficient volume of gas for inflating a restraint bag, and an annular sealing surface on a peripheral portion of the gas generator;
    a separate inflatable bag subassembly including a folded inflatable bag, and a rigid rim connected to the mouth of the bag including a second annular sealing surface;
    means for assembling the two subassemblies into a unitary structure by connecting the rigid rim to the gas generator with the annular sealing surface in opposition; and
    adapter plate means for mounting the assembled unitary structure on an automobile steering wheel; and wherein
    the annular sealing surfaces are recessed below the face of the gas generator through which gas is released so that the rigid portions of the inflatable bag subassembly do not extend substantially beyond the face of the gas generator; and
    the rigid rim comprises an inwardly directed flange within the recessed region of the gas generator and including the annular sealing surface thereunder, and an outwardly extending flange-like portion for connection to the gas generator.

4. An inflatable bag restraint system as defined in claim 3 wherein the mounting plate means is connected to both the gas generator and the outwardly extending flange-like portion; and further comprising a resilient sealing gasket between the annular sealing surface on the gas generator and the annular sealing surface on the rigid rim.

* * * * *